(12) United States Patent
Nakagawa et al.

(10) Patent No.: US 10,213,868 B2
(45) Date of Patent: Feb. 26, 2019

(54) MANUFACTURING METHOD FOR CONSTANT VELOCITY UNIVERSAL JOINT OUTER JOINT MEMBER AND OUTER JOINT MEMBER

(71) Applicants: Naoki Nakagawa, Shizuoka (JP);
Shintaro Suzuki, Shizuoka (JP)

(72) Inventors: Naoki Nakagawa, Shizuoka (JP);
Shintaro Suzuki, Shizuoka (JP)

(73) Assignee: NTN CORPORATION, Osaka (JP)

( * ) Notice: Subject to any disclaimer, the term of this patent is extended or adjusted under 35 U.S.C. 154(b) by 181 days.

(21) Appl. No.: 15/319,086

(22) PCT Filed: May 20, 2015

(86) PCT No.: PCT/JP2015/064492
§ 371 (c)(1),
(2) Date: Dec. 15, 2016

(87) PCT Pub. No.: WO2015/194304
PCT Pub. Date: Dec. 23, 2015

(65) Prior Publication Data
US 2017/0120368 A1    May 4, 2017

(30) Foreign Application Priority Data

Jun. 17, 2014    (JP) .................. 2014-124329

(51) Int. Cl.
*B23K 15/00* (2006.01)
*B23K 15/04* (2006.01)
(Continued)

(52) U.S. Cl.
CPC .......... *B23K 15/0006* (2013.01); *B23K 15/00* (2013.01); *B23K 15/0033* (2013.01);
(Continued)

(58) Field of Classification Search
CPC ....................................................... B23K 15/04
(Continued)

(56) References Cited

U.S. PATENT DOCUMENTS 5,647,801 A * 7/1997 Jacob ..................... F16D 3/065
464/145
7,766,216 B2 * 8/2010 Daulton ............... A61N 1/3605
228/122.1
(Continued)

FOREIGN PATENT DOCUMENTS

CN       1924377      3/2007
EP       2 937 587    10/2015
(Continued)

OTHER PUBLICATIONS

Office Action dated Aug. 15, 2018 in corresponding Chinese Patent Application No. 201580031832.2, with English-language translation of the Search Report.
(Continued)

*Primary Examiner* — Samuel M Heinrich
(74) *Attorney, Agent, or Firm* — Wenderoth, Lind & Ponack, L.L.P.

(57) ABSTRACT

A method of manufacturing an outer joint member of a constant velocity universal joint includes forming cup and shaft members of medium carbon steel, the cup member being manufactured by preparing a cup member having cylindrical and bottom portions being integrally formed, and a fitting hole formed in a thick portion of the bottom portion, the shaft member being manufactured by preparing a shaft member having a fitting outer surface formed at an end portion of the shaft member to be joined to the bottom portion of the cup member, and fitting the fitting hole of the cup member to the fitting outer surface of the shaft member. The method also includes welding the cup and shaft mem-
(Continued)

bers from an inner side of the cup member to a fitted portion between the cup and shaft members.

9 Claims, 17 Drawing Sheets

(51) Int. Cl.
  *B23K 15/08* (2006.01)
  *F16D 3/24* (2006.01)
  *C21D 9/00* (2006.01)
  *F16D 3/20* (2006.01)
  *F16D 3/202* (2006.01)

(52) U.S. Cl.
  CPC ............ *B23K 15/08* (2013.01); *C21D 9/0068* (2013.01); *F16D 3/20* (2013.01); *F16D 3/202* (2013.01); *F16D 3/24* (2013.01)

(58) Field of Classification Search
  USPC ............. 219/121.13, 121.14, 121.31, 121.35
  See application file for complete search history.

(56) References Cited

U.S. PATENT DOCUMENTS

| | | | | |
|---|---|---|---|---|
| 2012/0138361 | A1* | 6/2012 | Elliott | H01R 9/05 174/74 R |
| 2015/0315668 | A1 | 11/2015 | Nakagawa et al. | |
| 2016/0201730 | A1 | 7/2016 | Osugi et al. | |
| 2017/0122378 | A1 | 5/2017 | Natsume et al. | |
| 2017/0159718 | A1 | 6/2017 | Osugi et al. | |

FOREIGN PATENT DOCUMENTS

| | | |
|---|---|---|
| EP | 3 040 570 | 7/2016 |
| EP | 3 124 813 | 2/2017 |
| EP | 3 156 677 | 4/2017 |
| JP | 2007-198566 | 8/2007 |
| JP | 2007-263299 | 10/2007 |
| JP | 2008-232189 | 10/2008 |
| JP | 2011-167746 | 9/2011 |
| JP | 2011-190903 | 9/2011 |
| JP | 2011-226589 | 11/2011 |
| JP | 2012-57696 | 3/2012 |
| JP | 2012-229714 | 11/2012 |
| JP | 2014-119096 | 6/2014 |

OTHER PUBLICATIONS

International Search Report dated Aug. 25, 2015 in corresponding International (PCT) Application No. PCT/JP2015/064492.
International Preliminary Report on Patentability and Written Opinion of the International Searching Authority dated Dec. 20, 2016 in corresponding International (PCT) Application No. PCT/JP2015/064492.
Nikkan Kogyo Shimbum, Ltd., Website Article, http://www.nikkan.co.jp/news/nkx0420140521beaj.html, May 21, 2014, with English statement of relevance.
NTN Corporation, Website Article, http://www.ntn.co.jp/japan/news/new_products/news201400038.html, May 22, 2014, with English statement of relevance.
Nikkei Business Publications, Inc., Website Article, http://techon.nikkeibp.co.jp/article/EVENT/20140522/353568, May 22, 2014, with English statement of relevance.
Sanpo Publications, Inc., Website Article, http://www.sanpo-pub.co.jp/topnews/2014/0523016259.html, Jun. 5, 2014, with English statement of relevance.
Mechanical-Tech, Inc., Website Article, http://mechanical-tech.jp/node/5915, May 24, 2014, with English statement of relevance.
IID, Inc., Website Article, http://response.jp/article/2014/05/26/223911.html, May 26, 2014, with English statement of relevance.
Carview Corporation, Website Article, http://carview.yahoo.co.jp/news/market/20140526-10204741-carview/, May 26, 2014, with English statement of relevance.
Yahoo Japan Corporation, Website Article, http://headlines.yahoo.co.jp/hl?a=20140526-00000002-rps-bus_all, May 26, 2014, with English statement of relevance.
Nikkan Kogyo Shimbun Ltd, Published Article, May 21, 2014, with English statement of relevance.
Nikkei Inc., Published Article, May 22, 2014, with English statement of relevance.
Nikkan Jidosha Shimbun Inc., Published Article, May 26, 2014, with English statement of relevance.
NTN Corporation, Exhibition at the Automotive Engineering Exposition 2014, Society of Automotive Engineers of Japan, Inc., Pacifico Yokohama, May 21-23, 2014, with English statement of relevance.
Extended European Search Report dated Nov. 3, 2017 in corresponding European Application No. 15809133.0.

* cited by examiner

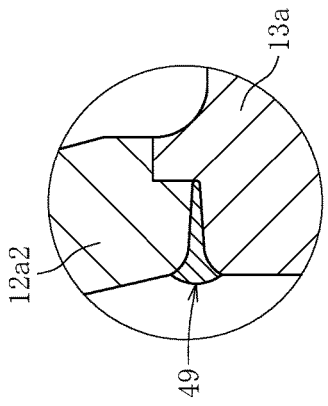
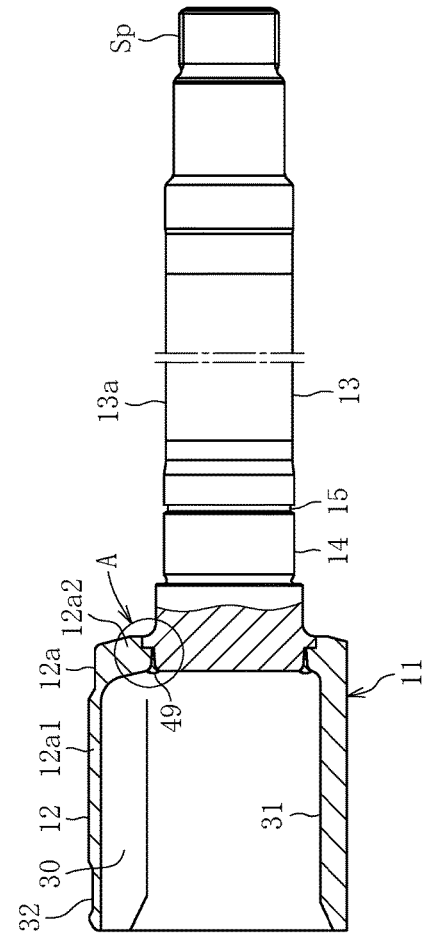
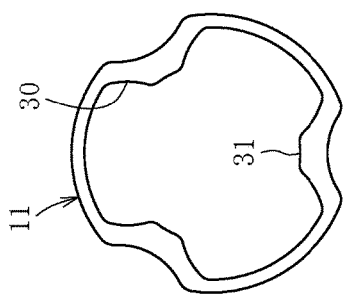

MANUFACTURING METHOD FOR CONSTANT VELOCITY UNIVERSAL JOINT OUTER JOINT MEMBER AND OUTER JOINT MEMBER

TECHNICAL FIELD

The present invention relates to a method of manufacturing an outer joint member of a constant velocity universal joint and an outer joint member.

BACKGROUND ART

In a constant velocity universal joint, which is used to construct a power transmission system for automobiles and various industrial machines, two shafts on a driving side and a driven side are coupled to each other to allow torque transmission therebetween, and rotational torque can be transmitted at a constant velocity even when each of the two shafts forms an operating angle. The constant velocity universal joint is roughly classified into a fixed type constant velocity universal joint that allows only angular displacement, and a plunging type constant velocity universal joint that allows both the angular displacement and axial displacement. In a drive shaft configured to transmit power from an engine of an automobile to a driving wheel, for example, the plunging type constant velocity universal joint is used on a differential side (inboard side), and the fixed type constant velocity universal joint is used on a driving wheel side (outboard side).

Irrespective of the plunging type and the fixed type, the constant velocity universal joint includes, as main components, an outer joint member including a cup section having track grooves formed in an inner peripheral surface thereof and engageable with torque transmitting elements, and a shaft section that extends from a bottom portion of the cup section in an axial direction. In many cases, the outer joint member is constructed by integrally forming the cup section and the shaft section by subjecting a rod-like solid blank (bar material) to plastic working such as forging and ironing or processing such as cutting work, heat treatment, and grinding.

Incidentally, as the outer joint member, an outer joint member including a long shaft section (long stem) may sometimes be used. In order to equalize lengths of a right intermediate shaft and a left intermediate shaft, the long stem is used for an outer joint member on the inboard side that corresponds to one side of the drive shaft. The long stem is rotatably supported by a rolling bearing. Although varied depending on vehicle types, the length of the long stem section is approximately from 300 mm to 400 mm in general. In the outer joint member, the long shaft section causes difficulty in integrally forming the cup section and the shaft section with high accuracy. Therefore, there is known an outer joint member in which the cup section and the shaft section are formed as separate members, and both the members are joined through friction press-contact. Such a friction press-contact technology is described in, for example, Patent Document 1.

An overview of the friction press-contact technology for the outer joint member described in Patent Document 1 is described with reference to FIG. 17 and FIG. 18. An intermediate product 71' of an outer joint member 71 includes a cup member 72 and a shaft member 73, which are joined through the friction press-contact. As illustrated in FIG. 17, burrs 75 are generated in inner and outer diameter portions on a joining portion 74 along with the press-contact.

In order to mount a rolling bearing (see FIG. 1) to a shaft section of the intermediate product 71' of the outer joint member 71, as illustrated in FIG. 18, it is necessary to remove the burrs 75 on the radially outer side of the joining portion 74 through processing such as turning. Although illustration is omitted, the intermediate product 71' is processed into a finished product of the outer joint member 71 through machining of a spline, snap ring grooves, and the like. Therefore, the outer joint member 71 and the intermediate product 71' have slight differences in shape, but illustration of the slight differences in shape is omitted in FIG. 18 to simplify the description, and the outer joint member 71 being the finished product and the intermediate product 71' are denoted by the reference symbols at the same parts. The same applies to the description below.

PRIOR ART DOCUMENTS

Patent Documents

Patent Document 1: JP 2012-57696 A

SUMMARY OF THE INVENTION

Problems to be Solved by the Invention

The burrs 75 on the joining portion 74 generated due to the friction press-contact described above are quenched by friction heat and cooling that follows the friction heat. Thus, the burrs 75 have a high hardness and a distorted shape extended in a radial direction and an axial direction. Therefore, as illustrated in FIG. 18, when removing the burrs 75 on the radially outer side through the turning, a tip for turning is liable to be significantly abraded due to the high hardness and cracked due to the distorted shape. Therefore, it is difficult to increase the turning speed. In addition, the cutting amount per pass of the tip for turning is decreased, and hence the number of passes is increased, which causes a problem in that the cycle time is increased to increase manufacturing cost.

Further, in order to inspect a joining state of the joining portion 74 of the outer joint member 71, when ultrasonic flaw detection, which enables flaw detection at high speed, is to be performed, an ultrasonic wave is scattered due to the burrs 75 remaining on the radially inner side of the joining portion 74, and hence the joining state cannot be checked. Therefore, there occurs a problem in that total inspection through the ultrasonic flaw detection cannot be performed after the joining.

In view of the above-mentioned problems, when the components are joined through laser welding or electron beam welding, the surfaces of the joining portion may be prevented from being increased in thickness unlike the case of the friction press-contact. However, when the cup member 72 and the shaft member 73 as illustrated in FIG. 19 are brought into abutment against each other to be welded, a gas pressure in a hollow cavity portion 76 is increased due to processing heat during the welding, and after completion of the welding, the pressure is decreased. Due to the variation in the internal pressure of the hollow cavity portion 76, blowing of a molten material occurs. Thus, a recess is formed on radially outer surfaces of the welded portion, poor welding in terms of depth occurs, and air bubbles are generated inside the welded portion, thereby degrading the welding state. As a result, the strength of the welded portion is not stable, which adversely affects quality.

To address the above-mentioned problem, the cup member 72 and the shaft member 73 may be welded to each other by evacuating the hollow cavity portion 76 formed at an abutment portion. However, it was found that there remain problems in terms of technology, cost, and the like as described later.

In addition, the cup member 72 and the shaft member 73, which are joined through the friction press-contact as illustrated in FIG. 17 and FIG. 18 or joined by welding as illustrated in FIG. 19 as described above, are joined at an intermediate position on the entire shaft section. Accordingly, as described later, it was found that there is also a problem in terms of cost reduction achieved through enhancement of productivity and standardization of a product type of the cup member.

In addition, the inventors of the present invention have focused on the fact that, in the outer joint member of the constant velocity universal joint being a mass-produced product for automobiles and the like, it is essential to enhance accuracy and operability during press-fitting before the welding of the cup member and the shaft member.

The present invention has been proposed in view of the above-mentioned problems, and has an object to provide a method of manufacturing an outer joint member and an outer joint member, which are capable of improving accuracy and operability during press-fitting before welding, increasing strength and quality of a welded portion, reducing welding cost, enhancing productivity, and achieving reduction of cost and reduction of a burden of production management through standardization of a product type.

Solution to the Problems

In order to achieve the above-mentioned object, the inventors of the present invention have diligently conducted research and verification to arrive at the following findings. Based on the findings from multiple aspects, the inventors of the present invention have conceived a novel manufacturing concept to achieve the present invention.

(1) In terms of production technology in laser welding and electron beam welding, there is a problem in that, when the cup member 72 and the shaft member 73 are welded to each other under a state in which the cup member 72 and the shaft member 73 are arranged in a sealed space and the hollow cavity portion 76 is evacuated, a time period required for evacuation varies depending on the product size. In particular, when a long shaft member such as an outer joint member of a long stem type is welded, a longer evacuation time is required, which extends a cycle time, leading to increase in cost of a joining step.

(2) Further, in terms of productivity, there is a problem in that, when welding is performed on the cup member and the shaft member in a finished state after being subjected to heat treatment such as quenching and tempering in order to enhance productivity, temperature of a peripheral portion is increased by heat generated during the welding, which causes reduction in hardness of a region subjected to heat treatment. To address this problem, a cup member and a shaft member serving as workpieces may be cooled by water cooling, air cooling, or the like during the welding. However, it was found that, when this method is applied in a sealed space, the vacuum degree is decreased, and there remain problems such as instability of the strength of the welded portion and adverse effects on quality.

(3) Still further, in terms of productivity and standardization of the product type, the cup member 72 illustrated in FIG. 17 to FIG. 19 has a shape having a short shaft section formed by forging or the like to have a diameter smaller than that of the bottom portion of the cup section, and the cup member 72 and the shaft member 73 are joined to each other at an intermediate position on the entire shaft section. Depending on a vehicle to which the shaft member 73 is assembled, the shaft member 73 is required to have a variety of shaft diameters and outer peripheral shapes in addition to differences in types such as a general length stem type and a long stem type. Therefore, a cup member 72 dedicated to one type of the shaft member 73 is required due to differences both in shaft diameter (joining diameter) and in shape and length (joining position) of the short shaft section of the cup member 72 to be joined to the shaft member 73. Therefore, it was found that there is a problem also in terms of cost reduction achieved through enhancement of productivity and standardization of a product type of the cup member.

(4) As another item, the inventors of the present invention have found that, in the outer joint member of the constant velocity universal joint being a mass-produced product for automobiles and the like, it is necessary to elaborate a shape of a fitted portion so that accuracy and operability during press-fitting before the welding of the cup member and the shaft member can be enhanced.

As a technical measure to achieve the above-mentioned object, according to one embodiment of the present invention, there is provided a method of manufacturing an outer joint member of a constant velocity universal joint, which is constructed by forming, through use of separate members, a cup section having track grooves formed at an inner periphery of the cup section and engageable with torque transmitting elements, and a shaft section formed at a bottom portion of the cup section, and by welding a cup member forming the cup section and a shaft member forming the shaft section, the method comprising: forming the cup member and the shaft member of medium carbon steel, the cup member being manufactured by preparing a cup member having a cylindrical portion and a bottom portion being integrally formed, and a fitting hole formed in a thick portion of the bottom portion in a machining step, the shaft member being manufactured by preparing a shaft member having a fitting outer surface formed at an end portion of the shaft member to be joined to the bottom portion of the cup member, which is formed in a machining step; fitting the fitting hole of the cup member to the fitting outer surface of the shaft member; and welding the cup member and the shaft member by radiating a beam from an inner side of the cup member to a fitted portion between the cup member and the shaft member, wherein the fitting hole of the cup member and the fitting outer surface of the shaft member are formed of a joining portion having a gap and a press-fitting portion having an interference, and an axial dimension of the joining portion is set to be larger than an axial dimension of the press-fitting portion, the joining portion serving as a press-fitting guide.

Further, according to one embodiment of the present invention for an outer joint member, there is provided an outer joint member of a constant velocity universal joint, comprising: a cup section having track grooves formed at an inner periphery of the cup section and engageable with torque transmitting elements; and a shaft section formed at a bottom portion of the cup section, the outer joint member being constructed by forming the cup section and the shaft section through use of separate members, and by welding a cup member forming the cup section and a shaft member forming the shaft section, the cup member and the shaft member being formed of medium carbon steel, the cup member having a cylindrical portion and a bottom portion being integrally formed, and a fitting hole formed in a thick portion of the bottom portion, the shaft member having a fitting outer surface formed at an end portion of the shaft member to be joined to the bottom portion of the cup member, the cup member and the shaft member being welded to each other under a state in which the fitting outer surface is fitted to the fitting hole, the outer joint member comprising a welded portion between the cup member and the shaft member, which is formed of a bead formed by a beam radiated from an inner side of the cup member, wherein the fitting hole of the cup member and the fitting outer surface of the shaft member are formed of a joining portion and a press-fitting portion, and an axial dimension of the joining portion is set to be longer than an axial dimension of the press-fitting portion, the joining portion serving as a press-fitting guide.

With the above-mentioned configuration, it is possible to achieve the method of manufacturing an outer joint member and the outer joint member, which are capable of increasing the strength and quality of the welded portion, reducing the welding cost, enhancing the productivity of the cup member and the shaft member, and achieving the reduction of cost and reduction of the burden of production management through and the standardization of a product type of the cup member. In particular, the fitting hole of the cup member and the fitting outer surface of the shaft member are formed of the joining portion having a gap and the press-fitting portion having an interference. The axial dimension of the joining portion is set to be larger than the axial dimension of the press-fitting portion. The joining portion serves as a press-fitting guide. Therefore, the coaxiality of the cup member and the shaft member, and the centering operability during the press-fitting are enhanced.

When an inner diameter of the joining portion of the cup member is set to an equal dimension for each joint size, a degree of processing for the cup member to be standardized in product type can be increased. As a result, the enhancement of productivity and reduction of the burden of production management can be further promoted.

In this case, in Claims and Specification of the present invention, setting the inner diameter of the joining portion of the cup member to an equal dimension for each joint size is not limited to preparing one type of the cup member for one joint size, that is, not limited to preparing the cup member assigned with a single product number. For example, the present invention encompasses preparing cup members of a plurality of types (assigned with a plurality of product numbers, respectively) for one joint size based on different specifications of a maximum operating angle, and setting the inner diameter of the joining portion of each of the cup members to an equal dimension. In addition, the present invention encompasses, for example, preparing cup members of a plurality of types (assigned with a plurality of product numbers, respectively) for one joint size in order to achieve management of the cup members in a plurality of forms including intermediate components before heat treatment and finished components after heat treatment in consideration of the joint function, the circumstances at the manufacturing site, the productivity, and the like, and setting the inner diameter of the joining portion of each of the cup members to an equal dimension.

Further, in Claims and Specification of the present invention, setting the inner diameter of the joining portion of the cup member to an equal dimension for each joint size may be applied also to different types of constant velocity universal joints. For example, the present invention encompasses setting inner diameters of joining portions of a tripod type constant velocity universal joint and a double-offset constant velocity universal joint to equal dimensions on the inboard side, and encompasses setting inner diameters of the joining portions of a Rzeppa type constant velocity universal joint and an undercut-free type constant velocity universal joint to equal dimensions on the outboard side. Further, the present invention also encompasses setting the outer diameters of the joining end surfaces of the constant velocity universal joints on the inboard side and the outboard side to equal dimensions on the inboard side and the outboard side.

It is desired that the diameter dimension of the press-fitting portion be set to be larger than that of the joining portion, and that the press-fitting portion be arranged on an outer side in the thick portion of the bottom portion of the cup member. With this, press-fitting can be performed through the shaft member from the bottom portion of the cup member, which enhances productivity.

When the diameter of the gap of the joining portion is set to 0.5 mm or less, the effect of a press-fitting guide can be obtained, and a satisfactory welded portion can be obtained without any defects such as a surface recess of the welded portion and burn-through.

It is desired that at least one of the cup member and the shaft member before the welding be prepared as a finished component subjected to the finishing such as grinding after the heat treatment or cutting work after the quenching. With this, it is possible to obtain the cup member prepared as the finished component for common use for each joint size, and the shaft member having a variety of specifications of the shaft section for each vehicle type. Thus, the cup member and the shaft member are each assigned with a product number for management. Therefore, the cost is significantly reduced through the standardization of a product type of the cup member, and the burden of production management is significantly alleviated. Further, the cup member prepared for common use and the shaft member having a variety of specifications of the shaft section can be manufactured separately until the cup member and the shaft member are formed into the finished components subjected to the finishing such as forging, turning, heat treatment, grinding, and cutting work after the quenching. Further, as well as reduction of setups and the like, the enhancement of productivity is achieved. However, in Specification and Claims of the present invention, the cup member and the shaft member as the finished components are not limited to members subjected to finishing (e.g., bearing mounting surface and sliding bearing surface) such as the grinding after the heat treatment or the cutting work after the quenching as described above, and the cup member and the shaft member encompass members assuming a state after completion of heat treatment but before being subjected to the finishing.

The above-mentioned welding is performed through electron beam welding, and hence burrs are not generated on the joining portion. Thus, manufacturing cost can be reduced through omission of the number of steps of post-processing for the joining portion. Further, total inspection on the joining portion through ultrasonic flaw detection can be securely performed. Further, deep penetration can be obtained by electron beam welding, thereby being capable of increasing welding strength and reducing thermal strain.

It is desired that the welding be performed under a state in which an inner portion of the cup section is at an atmospheric pressure or less. The internal space of the cup member is evacuated, and hence the space to be evacuated is reduced, which can reduce a cycle time and a difference in evacuation time depending on the product size. Thus, it is possible to support other product numbers and product types without increasing the cycle time. Further, in terms of quality, the internal space of the cup member is evacuated, and hence the quality of the welded portion can be enhanced.

It is desired that the cup section and the shaft section be welded to each other in a state of being cooled. With this, even when the cup member and the shaft member as the finished components subjected to heat treatment such as quenching and tempering are welded to each other, the problem of reduction in hardness of a region subjected to heat treatment caused by increase in temperature of a peripheral portion due to heat generated during the welding can be resolved. Further, a portion for cooling the cup section and the shaft section is not connected to the internal space of the cup member to be evacuated. Therefore, the problems of instability of the strength of the welded portion and adverse effects on quality caused by decrease in vacuum degree can also be resolved.

It is desired that the joining portion between the cup member and the shaft member be subjected to pre-heating to have a temperature of from 200° C. to 650° C. before the welding, and that the joining portion between the cup member and the shaft member be subjected to post-heating to have a temperature of from 200° C. to 650° C. after the welding. With this, the cooling rate after welding is reduced, thereby being capable of preventing a quenching crack. Further, the hardness of a welded portion is adjusted, with the result that a satisfactory welded state can be obtained.

EFFECTS OF THE INVENTION

According to the method of manufacturing an outer joint member of a constant velocity universal joint and the outer joint member of the present invention, it is possible to achieve the method of manufacturing an outer joint member and the outer joint member, which are capable of increasing the strength and quality of the welded portion, reducing the welding cost, enhancing productivity of the cup member and the shaft member, achieving the reduction of cost and reduction of the burden of production management through the standardization of a product type of the cup member. In particular, the fitting hole of the cup member and the fitting outer surface of the shaft member are formed of the joining portion having a gap and the press-fitting portion having an interference. The axial dimension of the joining portion is set to be larger than the axial dimension of the press-fitting portion. The joining portion serves as a press-fitting guide. Therefore, the coaxiality of the cup member and the shaft member, and the centering operability during the press-fitting are enhanced.

BRIEF DESCRIPTION OF DRAWINGS

FIG. 2a is an enlarged partial vertical sectional view for illustrating the outer joint member of FIG. 1.

FIG. 2b is an enlarged side view for illustrating the outer joint member of FIG. 1.

FIG. 2c is an enlarged view for illustrating a portion "A" of FIG. 2a.

EMBODIMENTS OF THE INVENTION

Now, description is made of embodiments of the present invention with reference to the drawings.

Figure 1:
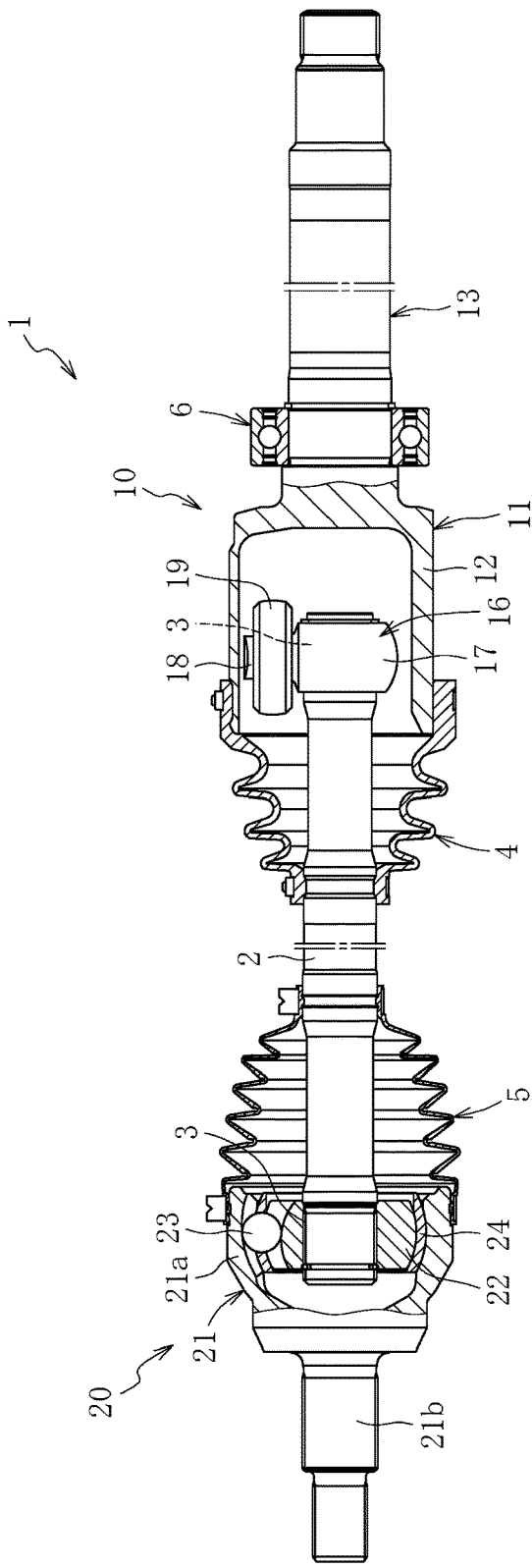
FIG. 1 is a view for illustrating the entire structure of a drive shaft to which an outer joint member according to a first embodiment of the present invention is applied.

FIG. 3 to FIG. 11 are illustrations of a method of manufacturing an outer joint member of a constant velocity universal joint according to a first embodiment of the present invention, and FIG. 1 and FIG. 2 are illustrations of an outer joint member according to the first embodiment of the present invention. First, the outer joint member according to the first embodiment is described with reference to FIG. 1 and FIG. 2, and FIG. 6 and FIG. 7 as needed. Subsequently, the method of manufacturing an outer joint member according to the first embodiment is described with reference to FIG. 3 to FIG. 11.

FIG. 1 is a view for illustrating the entire structure of a drive shaft 1 using an outer joint member 11 according to the first embodiment. The drive shaft 1 mainly comprises a plunging type constant velocity universal joint 10 arranged on a differential side (right side of FIG. 1: hereinafter also referred to as "inboard side"), a fixed type constant velocity universal joint 20 arranged on a driving wheel side (left side of FIG. 1: hereinafter also referred to as "outboard side"), and an intermediate shaft 2 configured to couple both the constant velocity universal joints 10 and 20 to allow torque transmission therebetween.

The plunging type constant velocity universal joint 10 illustrated in FIG. 1 is a so-called tripod type constant velocity universal joint (TJ), and comprises an outer joint member 11 comprising a cup section 12 and a long shaft section (long stem section) 13 that extends from a bottom portion of the cup section 12 in the axial direction, an inner joint member 16 housed along an inner periphery of the cup section 12 of the outer joint member 11, and a roller 19 serving as a torque transmitting element that is arranged between the outer joint member 11 and the inner joint member 16. The inner joint member 16 comprises a tripod member 17 comprising three equiangular leg shafts 18 on which the roller 19 is externally fitted.

An inner ring of a support bearing 6 is fixed to an outer peripheral surface of the long stem section 13, and an outer ring of the support bearing 6 is fixed to a transmission case with a bracket (not shown). The outer joint member 11 is supported by the support bearing 6 in a freely rotatable manner, and when the support bearing 6 as described above is provided, vibration of the outer joint member 11 during driving or the like is prevented as much as possible.

The fixed type constant velocity universal joint 20 illustrated in FIG. 1 is a so-called Rzeppa type constant velocity universal joint, and comprises an outer joint member 21 comprising a bottomed cylindrical cup section 21a and a shaft section 21b that extends from a bottom portion of the cup section 21a in the axial direction, an inner joint member 22 housed along an inner periphery of the cup section 21a of the outer joint member 21, balls 23 serving as torque transmitting elements that are arranged between the cup section 21a of the outer joint member 21 and the inner joint member 22, and a cage 24, which is arranged between an inner peripheral surface of the cup section 21a of the outer joint member 21 and an outer peripheral surface of the inner joint member 22, and is configured to retain the balls 23. As the fixed type constant velocity universal joint 20, an undercut-free type constant velocity universal joint may sometimes be used.

The intermediate shaft 2 comprises splines 3 for torque transmission (including serrations; the same applies hereinafter) at outer diameter portions on both end portions thereof. The spline 3 on the inboard side is spline-fitted to a hole portion of the tripod member 17 of the plunging type constant velocity universal joint 10. Thus, the intermediate shaft 2 and the tripod member 17 of the plunging type constant velocity universal joint 10 are coupled to each other to allow torque transmission therebetween. Further, the spline 3 on the outboard side is spline-fitted to a hole portion of the inner joint member 22 of the fixed type constant velocity universal joint 20. Thus, the intermediate shaft 2 and the inner joint member 22 of the fixed type constant velocity universal joint 20 are coupled to each other to allow torque transmission therebetween. Although the solid intermediate shaft 2 is illustrated, a hollow intermediate shaft may be used instead.

Grease is sealed inside both the constant velocity universal joints 10 and 20 as a lubricant. To prevent leakage of the grease to an outside of the joint or entry of a foreign matter from the outside of the joint, bellows boots 4 and 5 are respectively mounted to a portion between the outer joint member 11 of the plunging type constant velocity universal joint 10 and the intermediate shaft 2 and a portion between the outer joint member 21 of the fixed type constant velocity universal joint 20 and the intermediate shaft 2.

The outer joint member according to the first embodiment is described with reference to FIG. 2. FIG. 2 are enlarged views for illustrating the outer joint member 11 according to this embodiment. FIG. 2a is a partial vertical sectional view. FIG. 2b is a side view. FIG. 2c is an enlarged view for illustrating a portion "A" of FIG. 2a. The outer joint member 11 comprises the bottomed cylindrical cup section 12 that is opened at one end and has plurality of track grooves 30 and an inner peripheral surface 31, on which the roller 19 (see FIG. 1) is caused to roll, formed at trisecting positions on the inner peripheral surface, and the long stem section 13 that extends from the bottom portion of the cup section 12 in the axial direction and comprises a spline Sp serving as a torque transmitting coupling portion formed at an outer periphery on an end portion thereof on an opposite side (inboard side) to an opening side of the cup section 12. In this embodiment, the outer joint member 11 is formed by welding a cup member 12a and a shaft member 13a to each other.

Figure 6:
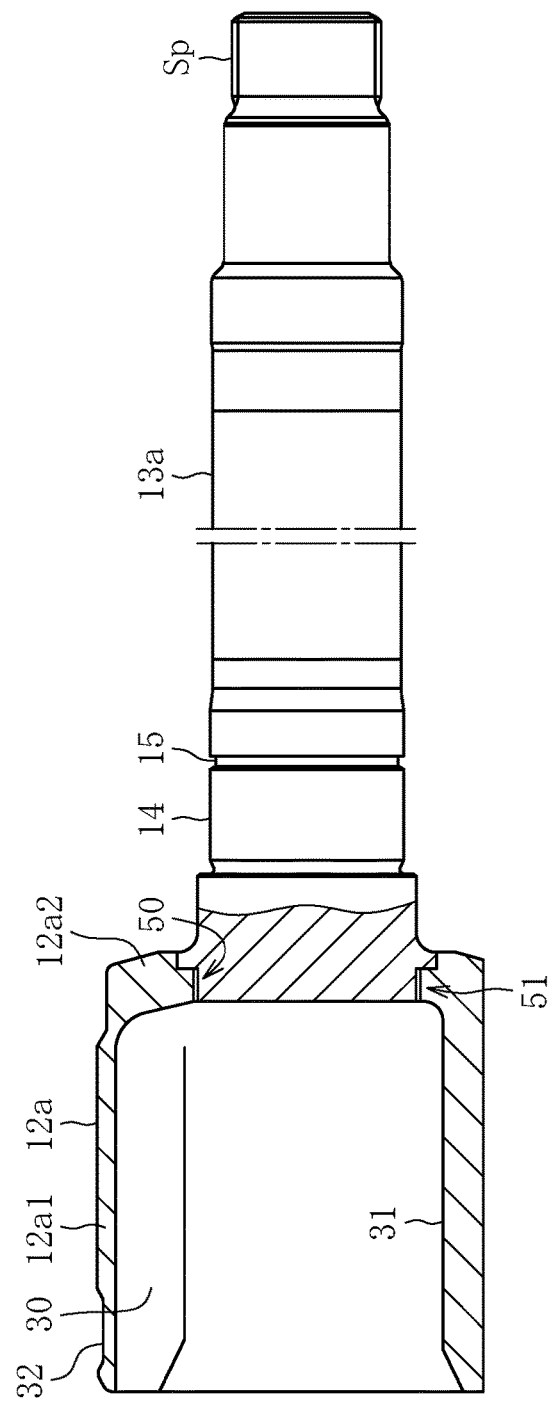
FIG. 6 is a partial vertical sectional view for illustrating a state in which the cup member and the shaft member are fitted to each other before welding.

As illustrated in FIG. 2a and FIG. 2c, the cup member 12a is an integrally-formed product comprising a cylindrical portion 12a1 having the track grooves 30 and the inner peripheral surface 31 at an inner periphery and a bottom portion 12a2. The shaft member 13a comprises a bearing mounting surface 14 and a snap ring groove 15 formed at an outer periphery of the shaft member 13a on the cup member 12a side and comprises a spline Sp formed at an end portion of the shaft member 13a on an inboard side. As illustrated in FIG. 6 and FIG. 7, a fitting hole 50 of the bottom portion 12a2 of the cup member 12a and a fitting outer surface 51 of the end portion of the shaft member 13a on an outboard side are fitted to each other, and a joining portion 50a of the fitting hole 50 and a joining portion 51a of the fitting outer surface 51 are welded to each other through electron beam welding. As illustrated in FIG. 2a and FIG. 2c, a welded portion 49 is formed of a bead formed by a beam radiated from an inner side of the cup member 12a.

Figure 7A:
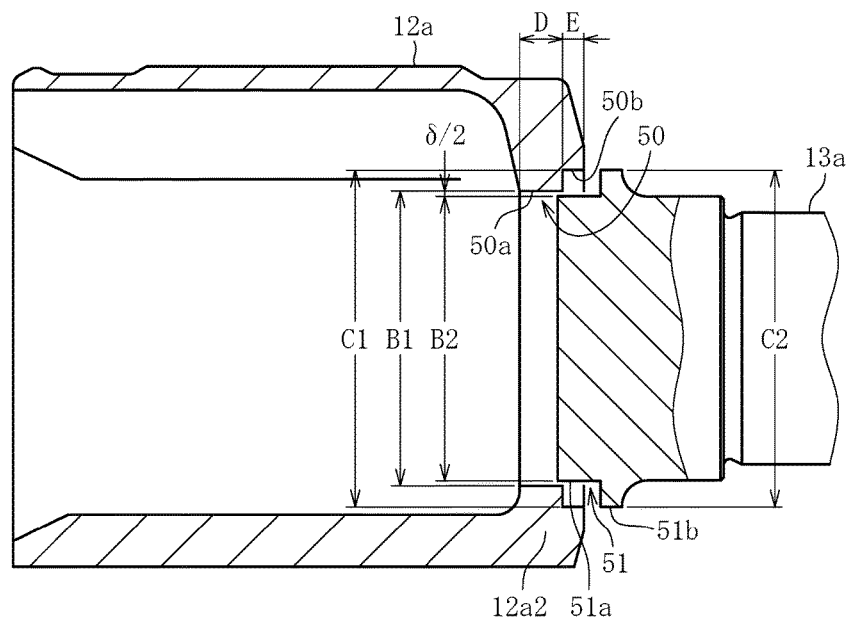
FIG. 7a is a partial vertical sectional view for illustrating details of a fitting hole of the cup member and a fitting outer surface of the shaft member and a centering operation during press-fitting, and for illustrating a state at the start of press-fitting.

Details of the features of the outer joint member 11 of this embodiment, that is, the fitting hole 50 of the cup member 12a and the fitting outer surface 51 of the shaft member 13a are described with reference to FIG. 7. As illustrated in FIG. 7a, the fitting hole 50 is formed in a thick portion of the bottom portion 12a2 of the cup member 12a, and the fitting hole 50 comprises the joining portion 50a and a press-fitting portion 50b. The fitting outer surface 51 of the shaft member 13a comprises the joining portion 51a and a press-fitting portion 51b.

An inner diameter B1 of the joining portion 50a of the cup member 12a is set to be slightly larger than an outer diameter B2 of the joining portion 51a of the shaft member 13a, and a gap δ having a diameter of 0.5 mm or less is formed between the inner diameter B1 and the outer diameter B2. Meanwhile, an inner diameter C1 of the press-fitting portion 50b of the cup member 12a is set to be slightly smaller than an outer diameter C2 of the press-fitting portion 51b of the shaft member 13a, and an interference is formed between the inner diameter C1 and the outer diameter C2. An axial dimension D of the joining portions 50a and 51a is set to be larger than an axial dimension E of the press-fitting portions 50b and 51b. Diameter dimensions C1 and C2 of the press-fitting portions 50b and 51b are set to be larger than diameter dimensions B1 and B2 of the joining portions 50a and 51a, and the press-fitting portions 50b and 51b are arranged on an outer side (right side of FIG. 7a) in the thick portion of the bottom portion 12a2 of the cup member 12a.

In FIG. 2a and FIG. 2c, the melted welded portion 49 is illustrated, but it is understood that the diameter dimensions C1 and C2 of the press-fitting portions 50b and 51b are set to be larger than the diameter dimensions B1 and B2 of the joining portions 50a and 51a.

Figure 7B:
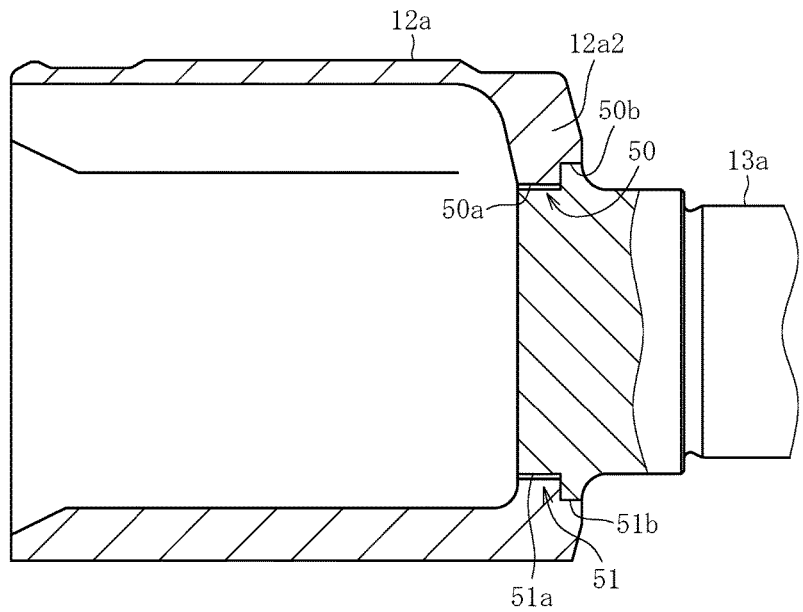
FIG. 7b is a partial vertical sectional view for illustrating details of the fitting hole of the cup member and the fitting outer surface of the shaft member and the centering operation during press-fitting, and for illustrating a state at the end of press-fitting.

The above-mentioned dimension relationship is set, and hence, during press-fitting, first, as illustrated in FIG. 7a, the joining portion 51a of the shaft member 13a is faced to the joining portion 50a of the cup member 12a. Then, through use of the joining portions 50a and 51a as press-fitting guides, the press-fitting portion 50b of the cup member 12a and the press-fitting portion 51b of the shaft member 13a are brought into abutment against each other while the cup member 12a and the shaft member 13a are being centered. Under a state in which the cup member 12a and the shaft member 13a are centered, the press-fitting portions 50b and 51b are press-fitted to each other, and thus a press-fitting step is completed as illustrated in FIG. 7b. The press-fitting is performed as described above, and hence the coaxiality of the cup member 12a and the shaft member 13a is enhanced. Further, as described above, the centering operability in the press-fitting step is enhanced.

The diameter of the gap δ between the inner diameter B1 of the joining portion 50a of the cup member 12a and the outer diameter B2 of the joining portion 51a of the shaft member 13a is set to 0.5 mm or less, and hence the press-fitting is not performed in the joining portions 50a and 51a. Thus, the effect of the press-fitting guides can be obtained, and a satisfactory welded portion can be obtained without any defects such as the surface recess of the welded portion and burn-through. The gap δ is illustrated in an exaggerated manner for easy understanding.

Further, the diameter dimensions C1 and C2 of the press-fitting portions 50b and 51b are set to be larger than the diameter dimensions B1 and B2 of the joining portions 50a and 51a, and the press-fitting portions 50b and 51b are arranged on an outer side (right side of FIG. 7a) in the thick portion of the bottom portion 12a2 of the cup member 13a. Therefore, as illustrated in FIG. 7a, the press-fitting can be performed through the shaft member 13a from the bottom portion 12a2 of the cup member 13a, which enhances productivity.

Although detailed description is made later, the inner diameter B1 of the joining portion 50a of the cup member 12a is set to an equal dimension for each joint size. The welded portion 49 is formed at the end portion of the shaft member 13a, and hence post-processing of the bearing mounting surface 14 and the like can be omitted. Further, due to the electron beam welding, burrs are not generated in the welded portion, and hence post-processing of the welded portion can also be omitted, which can reduce manufacturing cost. Further, total inspection on the welded portion through ultrasonic flaw detection can be securely performed.

Figure 3:
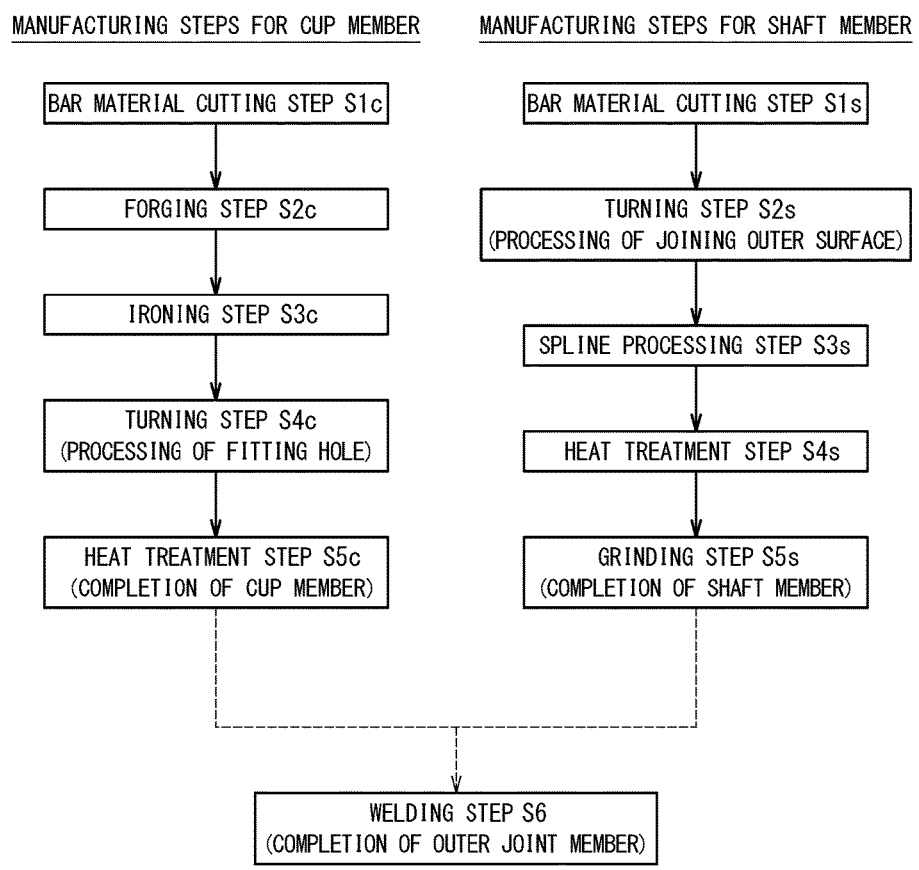
FIG. 3 is a diagram for illustrating an overview of manufacturing steps for the outer joint member of FIG. 1.

Next, the manufacturing method according to the first embodiment of the present invention is described with reference to FIG. 3 to FIG. 11. FIG. 3 is a diagram for illustrating an overview of manufacturing steps for the outer joint member. As illustrated in FIG. 3, the cup member 12a is processed into a finished component through main manufacturing steps comprising a bar material cutting step S1c, a forging step S2c, an ironing step S3c, a turning step S4c, and a heat treatment step S5c. Meanwhile, the shaft member 13a is processed into a finished component through main manufacturing steps comprising a bar material cutting step S1s, a turning step S2s, a spline processing step S3s, a heat treatment step S4s, and a grinding step S5s. The cup member 12a and the shaft member 13a as the finished components are each assigned with a product number for management. After that, the cup member 12a and the shaft member 13a are subjected to a welding step S6, to thereby complete the outer joint member 11. The machining step in Claims of the present invention corresponds to the turning step S4c, the turning step S2s, and the grinding step S5s of the above-mentioned manufacturing steps.

An overview of each step is described. Each step is described as a typical example, and appropriate modification and addition may be made to each step as needed. First, the manufacturing steps for the cup member 12a are described.

[Bar Material Cutting Step S1c]

A bar material is cut into a predetermined length in accordance with a forging weight, thereby producing a billet.

[Forging Step S2c]

The billet is subjected to forging to integrally form the cylindrical portion 12a1 and the bottom portion 12a2 of the cup member 12a, thereby forming a preform.

[Ironing Step S3c]

Ironing is performed on the track grooves 30 and the cylindrical inner peripheral surface 31 of the preform, thereby finishing the inner periphery of the cylindrical portion 12a1 of the cup member 12a.

[Turning Step S4c]

In the preform after ironing, the outer peripheral surface, a boot mounting groove 32, and the like, and the fitting hole 50 are formed by turning in the thick portion of the bottom portion 12a2.

[Heat Treatment Step S5c]

After turning, quenching and tempering are performed as heat treatment on at least the track grooves 30 of the cup section 12a. With this, the cup member 12a is processed into a finished component and assigned with a product number for management.

Next, the manufacturing steps for the shaft member 13a are described.

[Bar Material Cutting Step S1s]

A bar material is cut into a predetermined length in accordance with the entire length of the shaft section, thereby producing a billet. After that, the billet is forged into a rough shape by upset forging depending on the shape of the shaft member 13a.

[Turning Step S2s]

The outer peripheral surface of the billet or the forged preform (bearing mounting surface 14, snap ring groove 15, minor diameter of the spline, end surface, and the like) and the fitting outer surface 51 on the outboard side end portion are formed by turning.

[Spline Processing Step S3s]

The spline is formed by rolling in the shaft member after turning. Note that, the method of forming the spline is not limited to the rolling, and press working or the like may be adopted instead as appropriate.

[Heat Treatment Step S4s]

Induction quenching and tempering are performed as heat treatment on a necessary range of the outer periphery of the shaft member. Heat treatment is not performed on the fitting outer surface at a shaft end.

[Grinding Step S5s]

After the heat treatment, the bearing mounting surface 14 of the shaft section 13a and the like are finished by grinding. Thus, the shaft member 13a is completed and assigned with a product number for management.

[Welding Step S6]

The cup member 12a and the shaft member 13a as the finished components are fitted and welded to each other. With this, the outer joint member 11 is completed.

Figure 4:
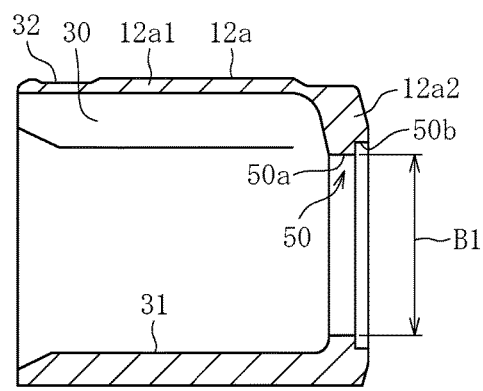
FIG. 4 is a vertical sectional view for illustrating a cup member before welding.

Next, main constituent features of the manufacturing method of this embodiment are described. FIG. 4 is a vertical sectional view for illustrating a state before welding of the cup member 12a as the finished component. The cup member 12a comprises the cylindrical portion 12a1 having the track grooves 30 and the inner peripheral surface 31 at an inner periphery and the bottom portion 12a2 that extends radially inward from the end portion on the inboard side thereof, and comprises the fitting hole 50 in the thick portion of the bottom portion 12a2. The cup member 12a is formed of medium carbon steel such as S53C, containing carbon of from 0.40 wt % to 0.60 wt %. The fitting hole 50 is subjected to cutting work in the turning step S4c described above. Although illustration is omitted, a hardened layer having a hardness of approximately from 58 HRC to 62 HRC is formed on each of the track grooves 30 and other predetermined portions.

Figure 5:
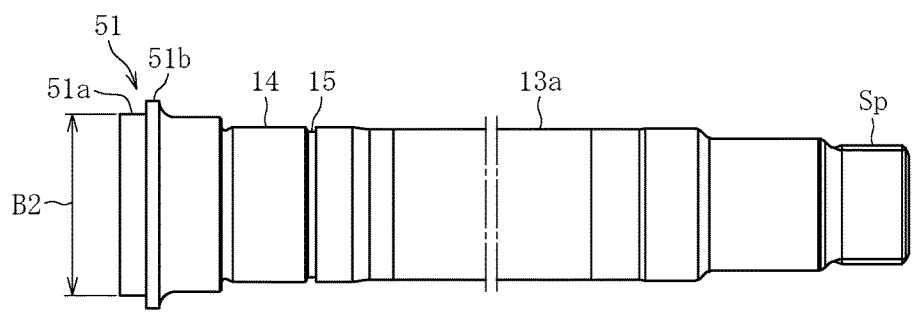
FIG. 5 is a front view for illustrating a shaft member before welding.

FIG. 5 is an illustration of a state before welding of the shaft member 13a as the finished component. The shaft member 13a comprises the fitting outer surface 51 to be fitted to the fitting hole 50 of the cup member 12a at the end portion on the outboard side (left side of FIG. 5), the bearing mounting surface 14 and the snap ring groove 15 on the inboard side (right side of FIG. 5) of the fitting outer surface 51, and the spline Sp at the end portion on the inboard side. The shaft member 13a is formed of medium carbon steel, such as S40C, containing carbon of from 0.30 wt % to 0.55 wt %. Although illustration is omitted, a hardened layer having a hardness of approximately from 50 HRC to 62 HRC is formed on a predetermined range of the outer periphery by induction quenching as heat treatment. Heat treatment is not performed on the fitting outer surface 51. After the heat treatment step S4s, the bearing mounting surface 14 is finished by grinding or the like.

As described above, the inner diameter B1 of the joining portion 50a of the cup member 12a illustrated in FIG. 4 is set to an equal dimension for one joint size. In the shaft member 13a illustrated in FIG. 5, which is used as a long stem shaft, the outer diameter B2 of the joining portion 51a at the end portion on the outboard side to be fitted to the joining portion 50a is set to a dimension having the predetermined gap δ (see FIG. 7a) from the inner diameter B1 of the joining portion 50a irrespective of the shaft diameter and the outer peripheral shape. Through the setting of dimensions as described above, the outer joint member 11 compatible with various vehicle types can be manufactured in such a manner that, while the cup member 12a is prepared for common use, only the shaft member 13a is manufactured to have a variety of shaft diameters, lengths, and outer peripheral shapes depending on vehicle types, and both the members 12a and 13a are welded to each other.

The cup member 12a and the shaft member 13a as the finished products manufactured as described above are subjected to press-fitting as illustrated in FIG. 6. As illustrated in FIG. 7b, the press-fitting portion 50b of the cup member 12a and the press-fitting portion 51b of the shaft member 13a are subjected to press-fitting, and hence both the members 12a and 13a are temporarily fixed in a state of being centered coaxially.

The details of the dimensional relationship of the fitting hole 50, the joining portion 50a, and the press-fitting portion 50b of the cup member 12a and the fitting outer surface 51, the joining portion 51a, and the press-fitting portion 51b of the shaft member 13a, the states of the cup member 12a and the shaft member 13a during press-fitting, and the action and effect are as described above with reference to FIG. 7a and FIG. 7b.

Figure 8:
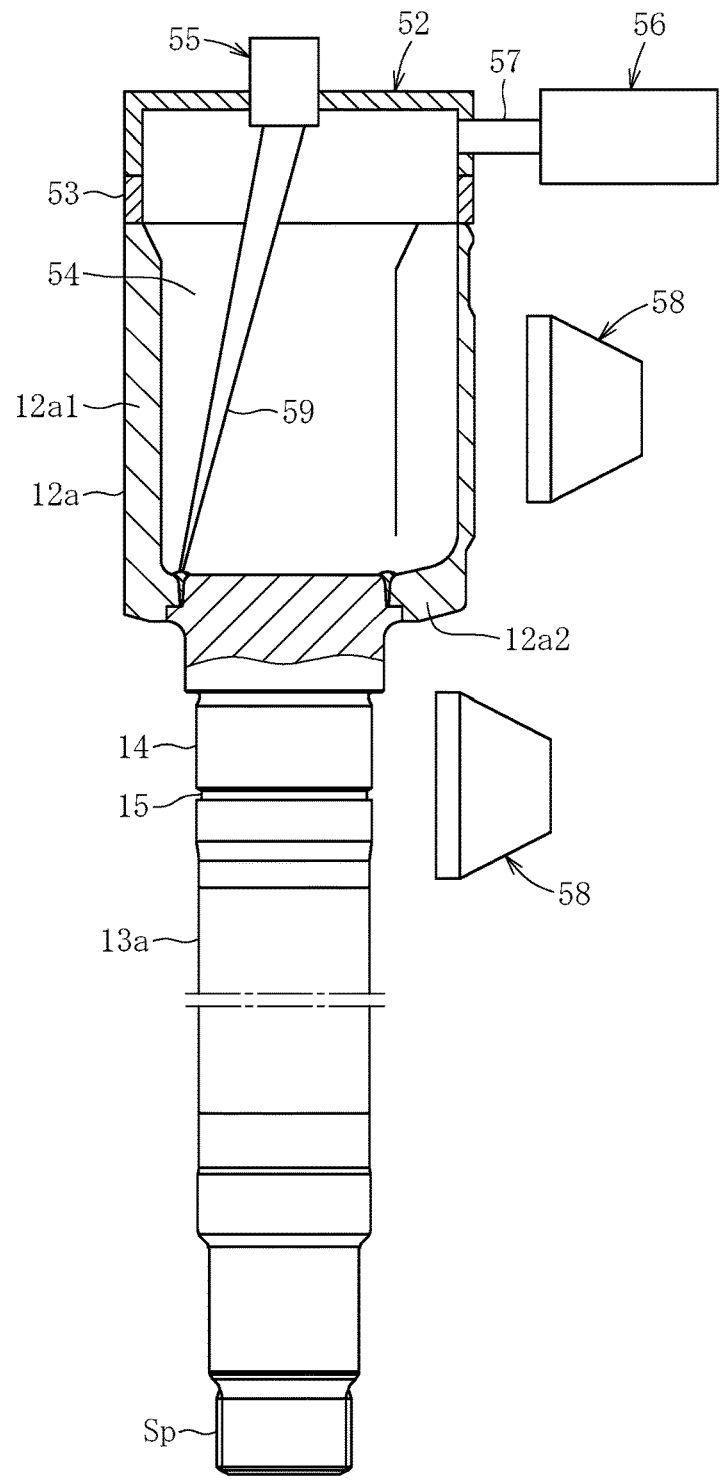
FIG. 8 is a view for illustrating an overview of a welding method in a manufacturing method according to a first embodiment of the present invention.

Next, the welding step S6 in the manufacturing method according to the first embodiment of the present invention is described with reference to FIG. 8. FIG. 8 is a view for illustrating an overview of the welding step S6. The cup member 12a and the shaft member 13a that are temporarily fixed through press-fitting are set on a welding apparatus (not shown). As illustrated in FIG. 8, a seal member 53 arranged at a cover member 52 is brought into abutment against an opening end portion of the cup member 12a to form a sealed space 54 in the cup member 12a. An electron gun 55 is arranged on the cover member 52, and a vacuum pump 56 configured to evacuate the sealed space 54 is connected to the cover member 52 through intermediation of a pipeline 57. Cooling jackets 58 are arranged on an outer side of the outer peripheral surface of the cup member 12a and on an outer side of the outer peripheral surface of the shaft member 13a, respectively.

Specifically, the seal member 53 arranged at the cover member 52 is brought into abutment against the opening end portion of the cup member 12a to form the sealed space 54 in the cup member 12a, and then, the sealed space 54 is evacuated to about 1.3 Pa which is equal to or less than an atmospheric pressure. In this embodiment, the sealed space 54 is limited in the cup member 12a, and the space volume is reduced. Therefore, the cycle time for evacuation is reduced. Along with the evacuation, in order to prevent rapid cooling after the welding to suppress increase in hardness of the welded portion, the periphery including the fitting hole 50 (see FIG. 6) and the fitting outer surface 51 is subjected to pre-heating to have a temperature of from 200° C. to 650° C. with an electron beam 59. The pre-heating is performed by enlarging the beam width of the electron beam 59 and turning the beam at high speed. After the pre-heating, as illustrated in FIG. 8, the beam of the electron beam 59 is narrowed down, to thereby perform welding. In this case, the welding is performed under the condition where the outer periphery of the cylindrical portion 12a1 of the cup member 12a and the outer periphery of the periphery of the bearing mounting surface 14 of the shaft member 13a are being cooled with the cooling jacket 58. Through adjustment of the hardness of the welded portion to from 200 Hv to 500 Hv by the pre-heating, a satisfactory welded portion that satisfies required strength can be obtained, and decrease in hardness of a region subjected to heat treatment can be prevented.

The above-mentioned welding step S6 is described with an example in which the pre-heating is performed before the welding in order to adjust the hardness of the welded portion. However, the joining portion may be subjected to post-heating to have a temperature of from 200° C. to 650° C. after the welding, to thereby adjust the hardness of the welded portion. Further, the pre-heating and the post-heating may be performed with a heat source such as induction heating in place of the electron beam.

Figure 9:
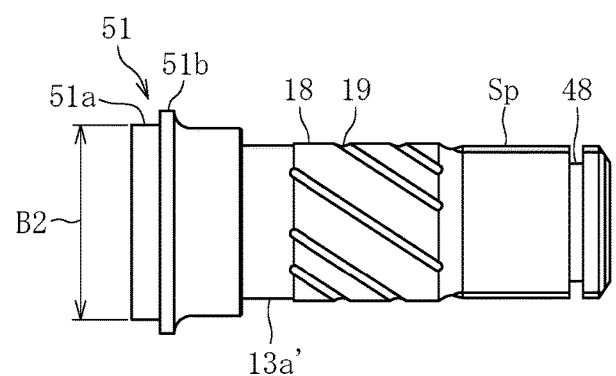
FIG. 9 is a front view for illustrating a shaft member assigned with a different product number.
Figure 10:
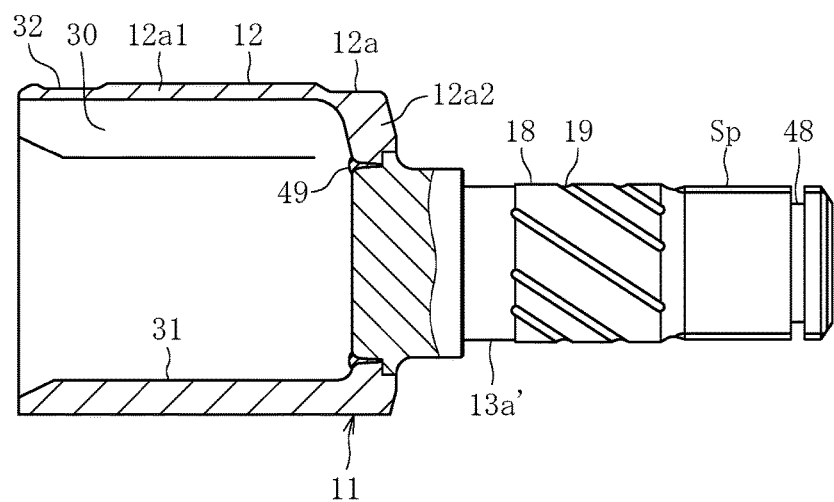
FIG. 10 is a partial vertical sectional view for illustrating an outer joint member that is manufactured using the shaft member illustrated in FIG. 9.

Next, standardization of a product type of the cup member is additionally described while exemplifying a shaft member having a product number different from that of the above-mentioned shaft member 13a of the long stem type illustrated in FIG. 5. A shaft member 13a' illustrated in FIG. 9 and FIG. 10 is used as a general stem type on the inboard side. The shaft member 13a' has the fitting outer surface 51 to be fitted to the fitting hole 50 (see FIG. 4) of the bottom portion 12a2 of the cup member 12a. The outer diameter B2 of the joining portion 51a of the fitting outer surface 51 is set to the equal dimension to the outer diameter B2 of the fitting outer surface 51 of the shaft member 13a of the long stem type illustrated in FIG. 5.

The shaft member 13a' is used as the general stem type on the inboard side. Accordingly, the shaft member 13a' comprises a shaft section with a small length and a sliding bearing surface 18 formed on an axial center portion thereof, and a plurality of oil grooves 19 are formed in the sliding bearing surface 18. The spline Sp and a snap ring groove 48 are formed in an end portion of the shaft member 13a' on the inboard side. As described above, even when there are differences in types, such as the general length stem type and the long stem type, and shaft diameters and outer peripheral shapes vary in each vehicle type, the outer diameter B2 of the joining portions 51a of the fitting outer surfaces 51 of the shaft members 13a and 13a' are set to an equal dimension.

The inner diameter B1 of the joining portion 50a of the fitting hole 50 of the cup member 12a is set to an equal dimension for each joint size. Thus, the cup member prepared for common use for each joint size, and the shaft member having a variety of specifications of the shaft section for each vehicle type can be prepared as finished components. Further, the cup member and the shaft member can be assigned with a product number for management. Even with standardization of product types of the cup member, various types of the outer joint members 11 satisfying requirements can be produced quickly through combination of the cup member and the shaft member having a variety of specifications of the shaft section for each vehicle type. Therefore, standardization of a product type of the cup member can reduce cost and alleviate a burden of production management.

Figure 11:
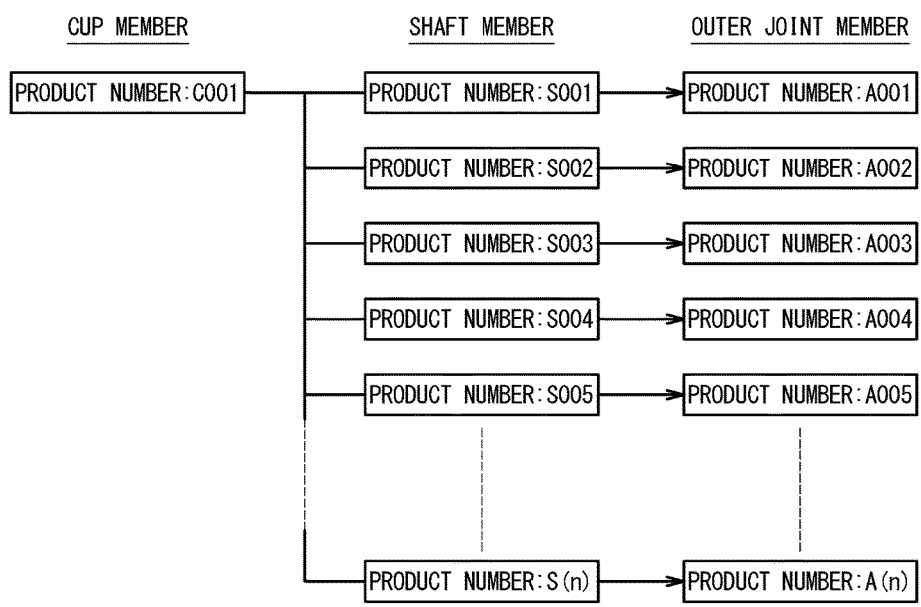
FIG. 11 is a diagram for illustrating an example of standardization of a product type of the cup member.

As a summary of the above description, FIG. 11 is a diagram for illustrating an example of standardization of a product type of the cup member. As illustrated in FIG. 11, the cup member is prepared for common use for one joint size, and is assigned with, for example, a product number C001 for management. In contrast, the shaft member has a variety of specifications of the shaft section for each vehicle type, and is assigned with, for example, a product number S001, S002, or S(n) for management. For example, when the cup member assigned with the product number C001 and the shaft member assigned with the product number S001 are combined and welded to each other, the outer joint member assigned with a product number A001 can be produced. Thus, owing to standardization of a product type of the cup member, it is possible to reduce cost and to alleviate a burden of production management. In the standardization of a product type, the cup member is not limited to one type for one joint size, that is, not limited to one type assigned with a single product number. For example, the cup member comprises cup members of a plurality of types (assigned with a plurality of product numbers, respectively) that are prepared for one joint size based on different specifications of a maximum operating angle, and are each prepared so that the diameter of the joining portion of each of those cup members has an equal dimension.

Figure 12:
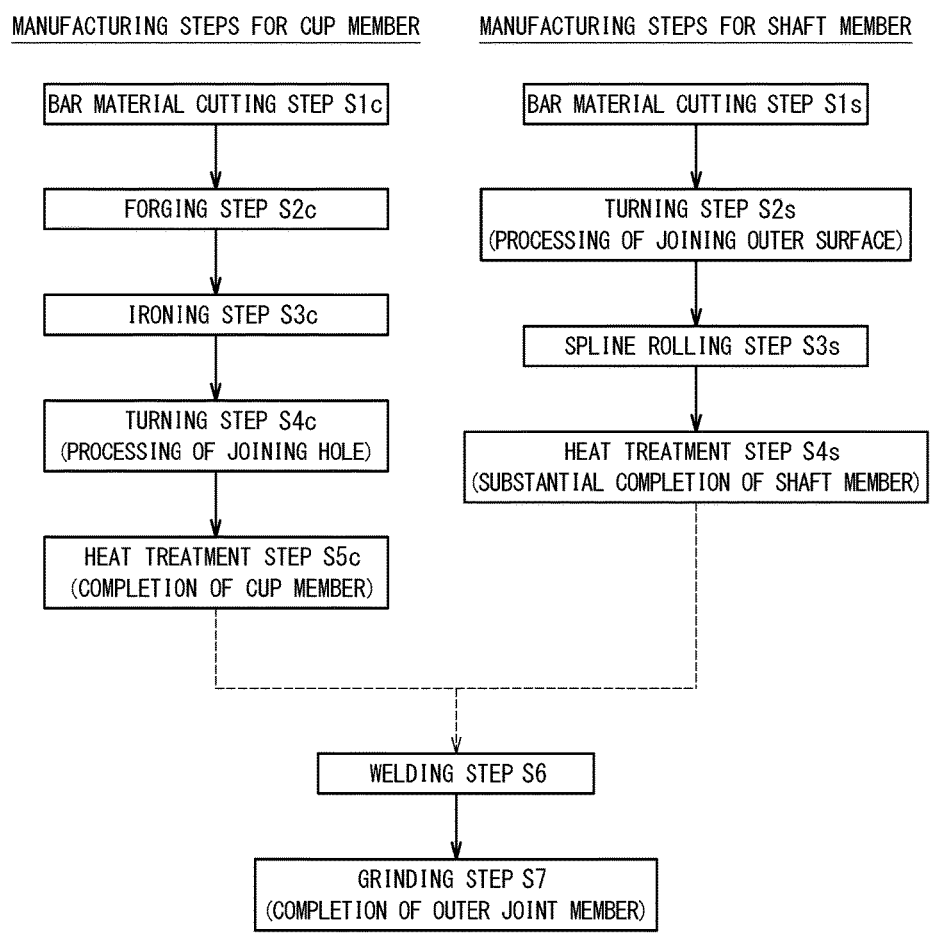
FIG. 12 is a diagram for illustrating an overview of a modified example of the manufacturing steps for the outer joint member according to the first embodiment.

FIG. 12 is an illustration of a modified example obtained by partially changing the manufacturing steps illustrated in FIG. 3. In the manufacturing steps of FIG. 12, the grinding step S5s for the shaft member of FIG. 3 is changed to a grinding step S7 after the welding step S6. In the manufacturing steps, the cup member and the shaft member are welded to each other, and then, the bearing mounting surface and the sliding bearing surface of the shaft member are finished by grinding. Therefore, in the heat treatment step S4s in the manufacturing steps for the shaft member of FIG. 12, there is described "substantial completion of shaft member". The other features are the same as those of the manufacturing steps illustrated in FIG. 3. Thus, the same processing steps are denoted by the same reference symbols to omit redundant description. In Specification and Claims of the present invention, the cup member and the shaft member as the finished components are not limited to members subjected to finishing (e.g., bearing mounting surface and sliding bearing surface) such as the grinding after the heat treatment or the cutting work after the quenching as described above in the first embodiment, and the cup member and the shaft member encompass members assuming a state after completion of heat treatment but before being subjected to the finishing.

Next, a manufacturing method according to a second embodiment of the present invention is described with reference to FIG. 13. The manufacturing steps of the first embodiment and the modified example described above are based on the cup member and the shaft member as the finished components. However, the second embodiment is different from the manufacturing steps of the first embodiment and the modified example in that the shaft member is prepared as an intermediate component obtained through the steps up to spline processing although the cup member is prepared as a finished component. Details of other aspects of the second embodiment than this aspect, that is, details of the overview of the respective steps, the states of the cup member and the shaft member in the main processing steps, the preparation of the cup member for common use, the welding method, the standardization of the product type, the configuration of the outer joint member, and the like as described above in the first embodiment on the manufacturing method are the same as those of the first embodiment. Therefore, all the details of the first embodiment are applied in this embodiment, and only the difference is described.

Figure 13:
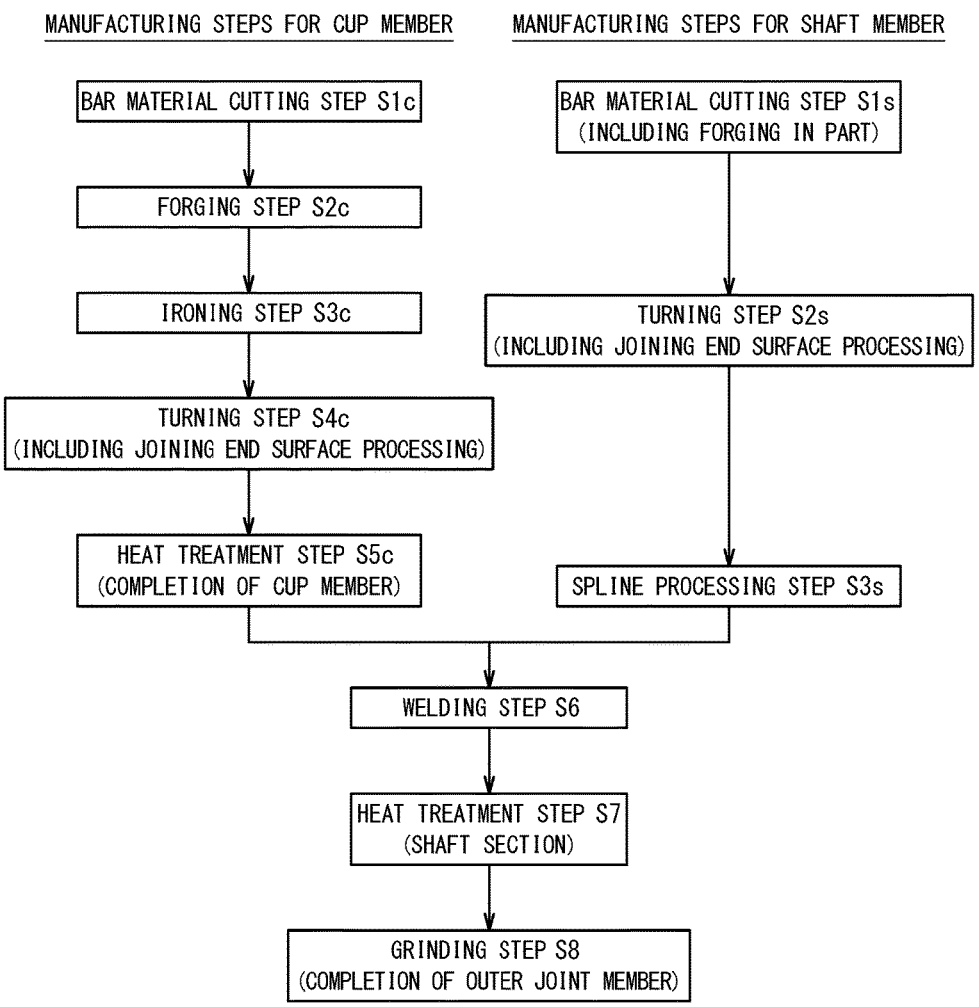
FIG. 13 is a diagram for illustrating manufacturing steps in a manufacturing method according to a second embodiment of the present invention.

As illustrated in FIG. 13, in this embodiment, the heat treatment step S4s and the grinding step S5s for the shaft member 13a in FIG. 3 are inserted as a heat treatment step S7 and a grinding step S8 after the welding step S6. In this embodiment, the heat treatment step S7 for the shaft member 13a is performed after the welding step S6. Therefore, there is no problem of reduction in hardness of a region subjected to heat treatment caused by increase in temperature of a peripheral portion due to heat generated during the welding, and the cooling jacket 58 configured to cool the outer periphery of the periphery of the bearing mounting surface 14 of the shaft member 13a in FIG. 8 can be omitted.

As illustrated in FIG. 4, the cup member 12a has a shape extending from the fitting hole 50 to the large-diameter cylindrical portion 12a1 via the bottom portion 12a2, and the portions to be subjected to heat treatment that involves quenching and tempering are the track grooves 30 and the inner peripheral surface 31 located at the inner periphery of the cylindrical portion 12a1. Therefore, the cup member 12a generally has no risk of thermal effect on the heat-treated portion during the welding. For this reason, the cup member 12a is subjected to heat treatment before the welding to be prepared as a finished component. The manufacturing steps of this embodiment are suitable in practical use.

In this embodiment, in FIG. 11 for illustrating the example of standardization of the product type of the cup member as described above in the first embodiment, only the product number of the shaft member in FIG. 11 is changed to the product number indicating an intermediate product, whereas the product numbers of the cup member and the outer joint member are the same as those of the first embodiment. Therefore, description thereof is omitted herein.

A manufacturing method according to a third embodiment of the present invention is described with reference to FIG. 14. In this embodiment, the heat treatment step S5c for the cup member of the second embodiment is further inserted as a heat treatment step S7 after the welding step S6. Details of other aspects of the third embodiment than this aspect, that is, details of the overview of the respective steps, the states of the cup member and the shaft member in the main processing steps, the preparation of the cup member for common use, the welding method, the standardization of the product type, the configuration of the outer joint member, and the like as described above in the first embodiment on the manufacturing method are the same as those of the first embodiment. Therefore, all the details of the first embodiment are applied in this embodiment, and only the difference is described.

Figure 14:
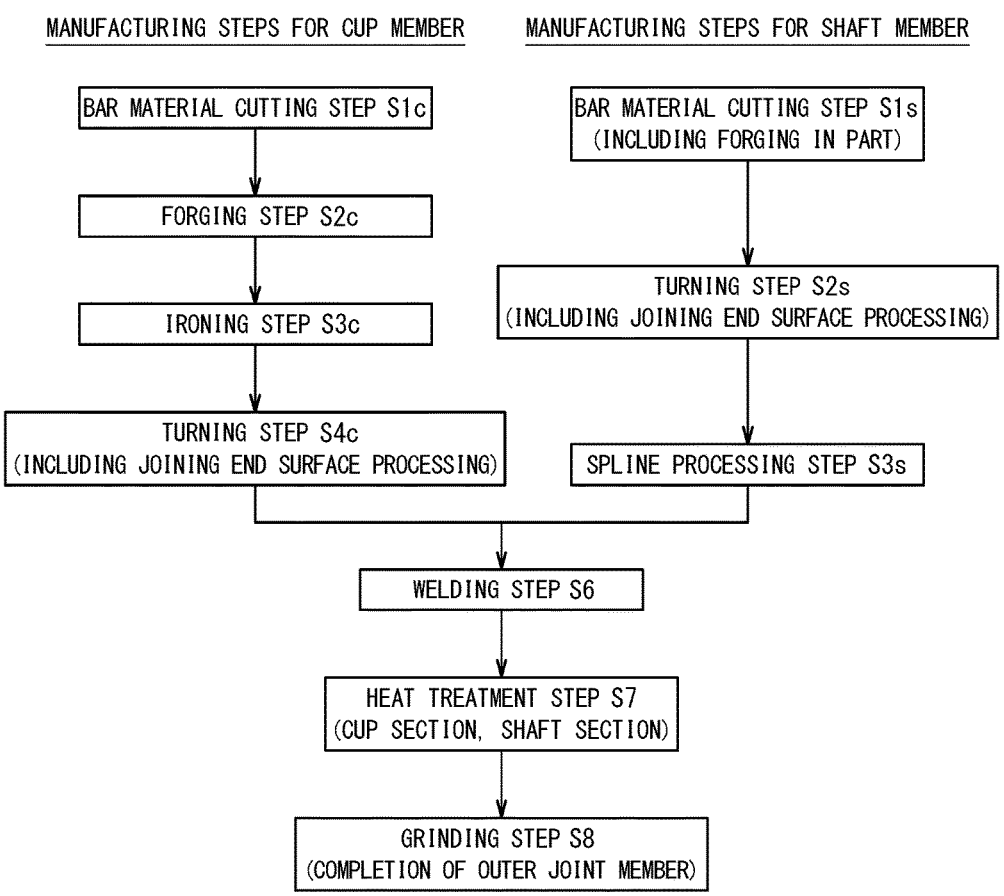
FIG. 14 is a diagram for illustrating manufacturing steps in a manufacturing method according to a third embodiment of the present invention.

As illustrated in FIG. 14, in this embodiment, the heat treatment step S7 for the cup member 12a and the shaft member 13a is performed after the welding step S6. Therefore, there is no problem of reduction in hardness of a region subjected to heat treatment caused by increase in temperature of a peripheral portion due to heat generated during the welding, and the cooling jacket 58 of FIG. 8 can be omitted.

In this embodiment, in FIG. 11 for illustrating the standardization of the product type of the cup member described above in the first embodiment, both the product numbers of the cup member and the shaft member of FIG. 11 serve as product numbers of intermediate components. The other aspects are the same as those of the first embodiment, and hence description is omitted.

Next, an outer joint member according to a second embodiment of the present invention is described with reference to FIG. 15 and FIG. 16. In this embodiment, parts that have the same function as those of the outer joint member according to the first embodiment are denoted by the same reference symbols (excluding subscripts). Therefore, description thereof is omitted herein.

Figure 15:
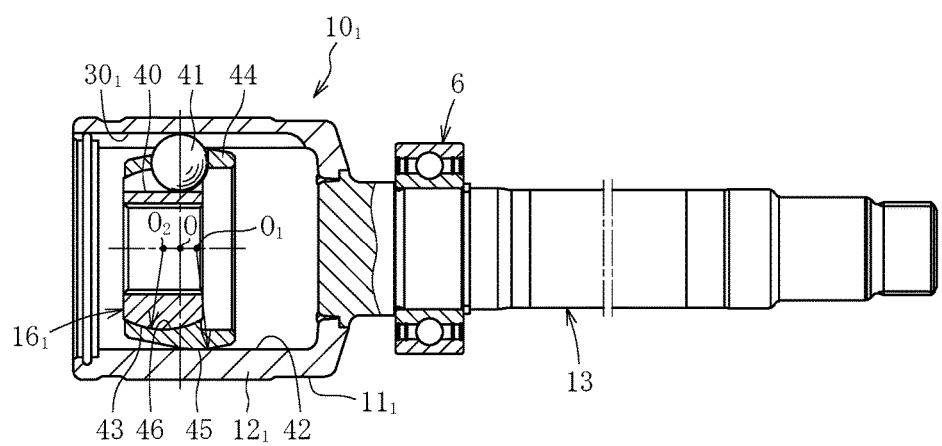
FIG. 15 is a partial vertical sectional view for illustrating a constant velocity universal joint using an outer joint member according to the second embodiment of the present invention.

A plunging type constant velocity universal joint $10_1$ illustrated in FIG. 15 is a double-offset constant velocity universal joint (DOJ). The constant velocity universal joint $10_1$ comprises an outer joint member $11_1$ comprising a cup section $12_1$ and the long stem section 13 that extends from a bottom portion of the cup section $12_1$ in an axial direction, an inner joint member $16_1$ housed along an inner periphery of the cup section $12_1$ of the outer joint member $11_1$, balls 41 serving as torque transmitting elements that are arranged between the outer joint member $11_1$ and track grooves $30_1$ and 40 of the inner joint member $16_1$, and a cage 44 having a spherical outer peripheral surface 45 and a spherical inner peripheral surface 46 that are fitted to a cylindrical inner peripheral surface 42 of the outer joint member $11_1$ and a spherical outer peripheral surface 43 of the inner joint member $16_1$, respectively, and being configured to retain the balls 41. A curvature center $O_1$ of the spherical outer peripheral surface 45 and a curvature center $O_2$ of the spherical inner peripheral surface 46 of the cage 44 are offset from a joint center O toward opposite sides in the axial direction.

Similarly to the first embodiment for describing the outer joint member, the inner ring of the support bearing 6 is fixed to the outer peripheral surface of the long stem section 13, and the outer ring of the support bearing 6 is fixed to the transmission case with the bracket (not shown). The outer joint member $11_1$ is supported by the support bearing 6 in a freely rotatable manner, and thus the vibration of the outer joint member $11_1$ during driving or the like is prevented as much as possible.

Figure 16:
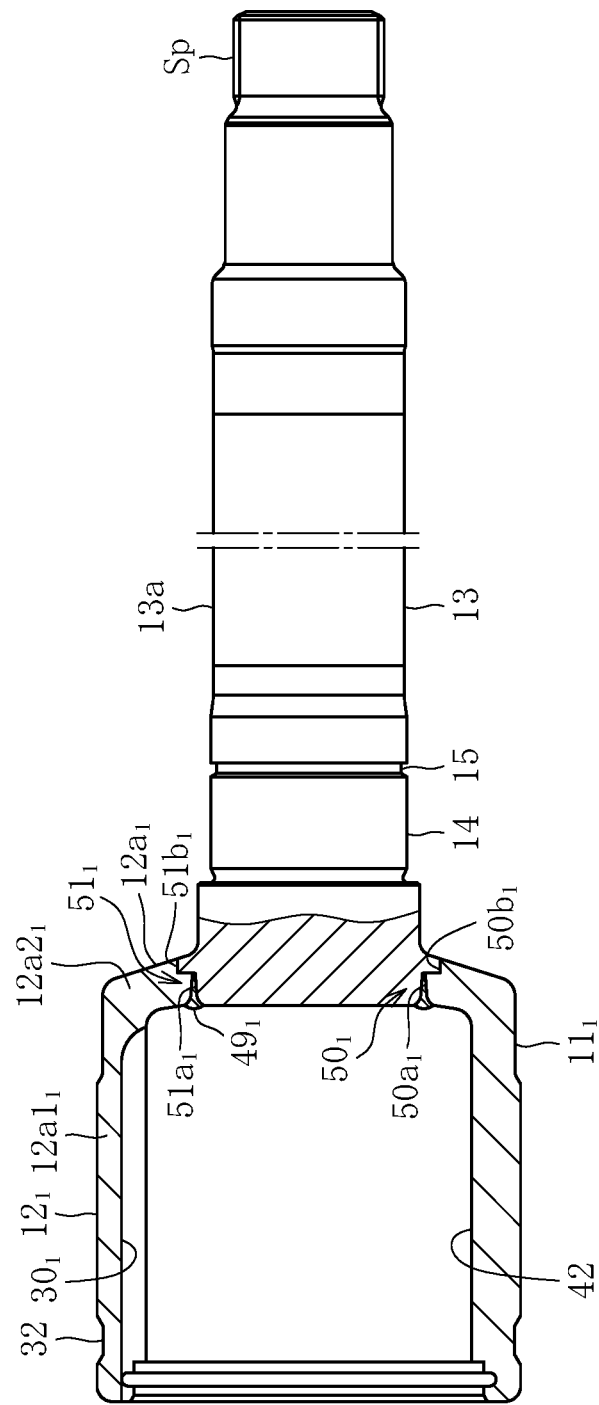
FIG. 16 is a vertical sectional view for illustrating the outer joint member of FIG. 15.
Figure 17:
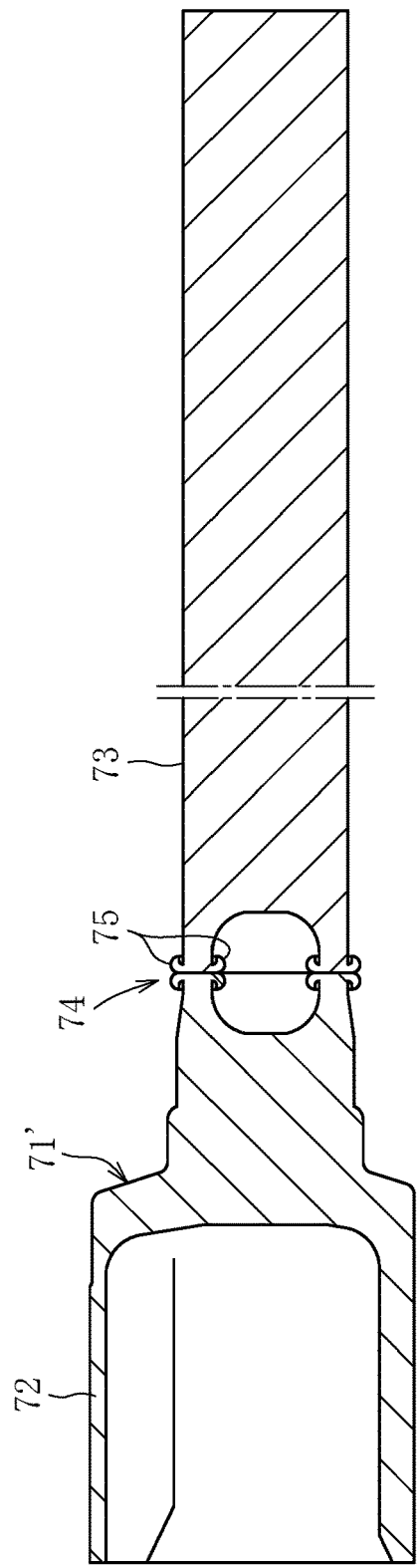
FIG. 17 is a vertical sectional view for illustrating an outer joint member according to a related art.
Figure 18:
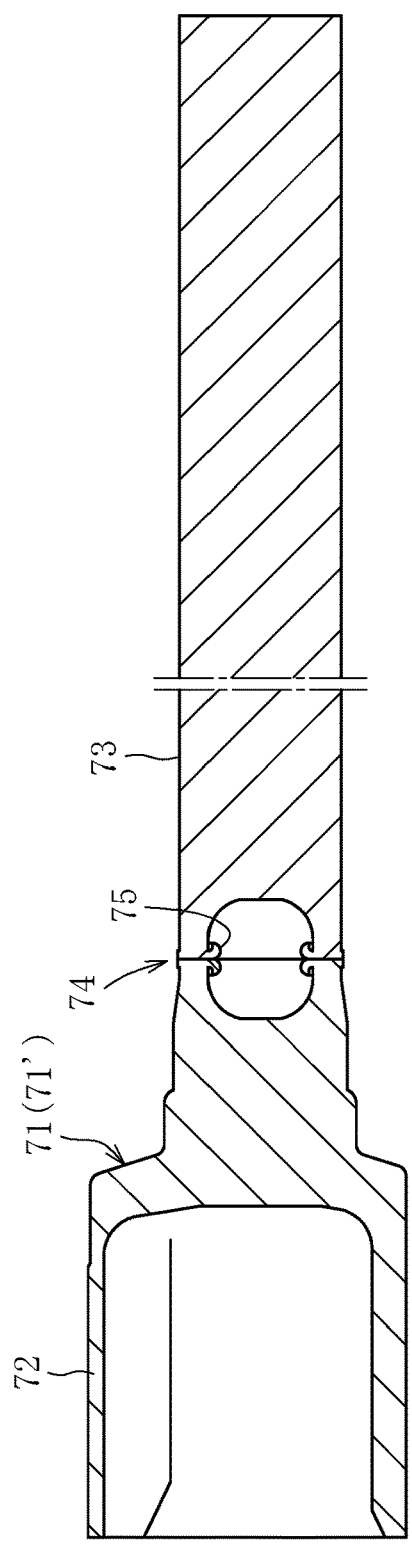
FIG. 18 is a vertical sectional view for illustrating the outer joint member according to the related art.
Figure 19:
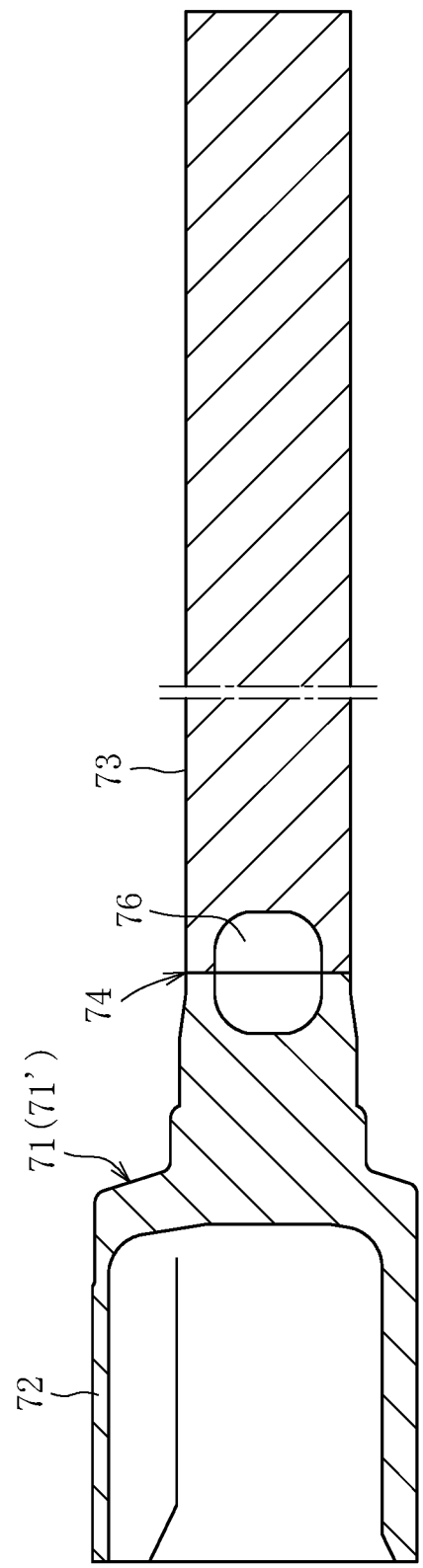
FIG. 19 is a vertical sectional view for illustrating an outer joint member according to a related art.

FIG. 16 is a partial vertical sectional view of the outer joint member $11_1$. As illustrated in FIG. 16, the outer joint member $11_1$ comprises the bottomed cylindrical cup section $12_1$ that is opened at one end and has the six or eight track grooves $30_1$, on which the balls 41 (see FIG. 15) are arranged, formed on the inner peripheral surface 42, and the long stem section 13 that extends from the bottom portion of the cup section $12_1$ in the axial direction and comprises a spline Sp serving as a torque transmitting coupling portion formed at an outer periphery on an end portion thereof on an opposite side (inboard side) to the cup section $12_1$. In the same manner as in the first embodiment, the outer joint member $11_1$ is formed by welding a cup member $12a_1$ and a shaft member 13a to each other.

A fitting hole $50_1$ is formed in a thick portion of a bottom portion $12a2_1$ of the cup member $12a_1$, and the fitting hole $50_1$ comprises a joining portion $50a_1$ and a press-fitting portion $50b_1$. A fitting outer surface $51_1$ of the shaft member 13a comprises a joining portion $51a_1$ and a press-fitting portion $51b_1$. The press-fitting portions $50b_1$ and $51b_1$ are arranged on an outer side (right side of FIG. 16) in the thick portion of the bottom portion $12a2_1$ of the cup member $13a_1$.

The details of the outer joint member according to this embodiment are the same as the details of the outer joint member according to the first embodiment, and the manufacturing method according to the first to third embodiments as described above. Therefore, all of those details are applied in this embodiment to omit redundant description.

In the above-mentioned embodiments, the case to which electron beam welding is applied is described, but laser welding is also similarly applicable.

In the outer joint member according to the embodiments described above, the cases where the present invention is applied to the tripod type constant velocity universal joint as the plunging type constant velocity universal joint 10, and to the double-offset constant velocity universal joint as the plunging type constant velocity universal joint $10_1$ are described. However, the present invention may be applied to an outer joint member of another plunging type constant velocity universal joint such as a cross-groove type constant velocity universal joint, and to an outer joint member of a fixed type constant velocity universal joint. Further, in the above, the present invention is applied to the outer joint member of the constant velocity universal joint, which is used to construct the drive shaft. However, the present invention may be applied to an outer joint member of a constant velocity universal joint, which is used to construct a propeller shaft.

The present invention is not limited to the above-mentioned embodiments. As a matter of course, various modifications can be made thereto without departing from the gist of the present invention. The scope of the present invention is defined in Claims, and encompasses equivalents described in Claims and all changes within the scope of claims.

DESCRIPTION OF REFERENCE SIGNS 1 drive shaft
2 intermediate shaft
3 spline
4 boot
5 boot
6 support bearing
10 plunging type constant velocity universal joint 11 outer joint member
12 cup section
12a cup member
12a1 cylindrical portion
12a2 bottom portion
13 long shaft section
13a shaft member
14 bearing mounting surface
16 inner joint member
17 tripod member
19 torque transmitting element (roller)
20 fixed type constant velocity universal joint
21 outer joint member
22 inner joint member
23 torque transmitting element (ball)
24 cage
30 track groove
31 inner peripheral surface
40 track groove
41 torque transmitting element (ball)
49 welded portion
50 fitting hole
50a joining portion
50b press-fitting portion
51 fitting outer surface
51a joining portion
51b press-fitting portion
52 cover member
54 sealed space
55 electron gun
56 vacuum pump
58 cooling jacket
59 electron beam
B1 diameter dimension (inner diameter)
B2 diameter dimension (outer diameter)
C1 diameter dimension (inner diameter)
C2 diameter dimension (outer diameter)
D axial dimension
E axial dimension
O joint center
$O_1$ curvature center
$O_2$ curvature center
Sp spline
δ gap

The invention claimed is:

1. A method of manufacturing an outer joint member of a constant velocity universal joint, which is constructed by forming, through use of separate members, a cup section having track grooves formed at an inner periphery of the cup section and engageable with torque transmitting elements, and a shaft section formed at a bottom portion of the cup section, and by welding a cup member forming the cup section and a shaft member forming the shaft section, the method comprising:

forming the cup member and the shaft member of medium carbon steel, the cup member being manufactured by preparing a cup member having a cylindrical portion and a bottom portion being integrally formed, and a fitting hole formed in a thick portion of the bottom portion in a machining step, the shaft member being manufactured by preparing a shaft member having a fitting outer surface formed at an end portion of the shaft member to be joined to the bottom portion of the cup member, which is formed in a machining step;

fitting the fitting hole of the cup member to the fitting outer surface of the shaft member; and welding the cup member and the shaft member by radiating a beam from an inner side of the cup member to a fitted portion between the cup member and the shaft member, wherein the fitting hole of the cup member and the fitting outer surface of the shaft member are formed of a joining portion having a gap and a press-fitting portion having an interference, and an axial dimension of the joining portion is set to be larger than an axial dimension of the press-fitting portion, the joining portion serving as a press-fitting guide.

2. The method of manufacturing an outer joint member of a constant velocity universal joint according to claim 1, wherein the joining portion of the cup member has an inner diameter set to an equal dimension for each joint size.

3. The method of manufacturing an outer joint member of a constant velocity universal joint according to claim 1, wherein the press-fitting portion has a diameter dimension larger than a diameter dimension of the joining portion, and the press-fitting portion is arranged on an outer side in the thick portion of the bottom portion of the cup member.

4. The method of manufacturing an outer joint member of a constant velocity universal joint according to claim 1, wherein the joining portion has the gap having a diameter of 0.5 mm or less.

5. The method of manufacturing an outer joint member of a constant velocity universal joint according to claim 1, wherein, before the welding, at least one of the cup member and the shaft member is subjected to finishing processing after heat treatment.

6. The method of manufacturing an outer joint member of a constant velocity universal joint according to claim 1, wherein the welding comprises electron beam welding.

7. The method of manufacturing an outer joint member of a constant velocity universal joint according to claim 1, wherein the welding is performed under a state in which an inner portion of the cup section is at an atmospheric pressure or less.

8. The method of manufacturing an outer joint member of a constant velocity universal joint according to claim 1, wherein the cup section and the shaft section are welded to each other in a state of being cooled.

9. The method of manufacturing an outer joint member of a constant velocity universal joint according to claim 1, wherein at least one of pre-heating before the welding and post-heating after the welding is performed to heat the joining portion of the cup section and the shaft section to from 200° C. to 650° C.

* * * * *